United States Patent
Chandramouli et al.

(10) Patent No.: US 10,667,304 B2
(45) Date of Patent: May 26, 2020

(54) LOW LATENCY SERVICE CONNECTION SETUP IN NEW SERVICE AREA

(71) Applicant: NOKIA SOLUTIONS AND NETWORKS OY, Espoo (FI)

(72) Inventors: Devaki Chandramouli, Plano, TX (US); Paolo Zanier, Munich (DE); Rainer Stademann, Berg (DE); Cinzia Sartori, Pullach (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/503,796

(22) PCT Filed: Aug. 22, 2014

(86) PCT No.: PCT/US2014/052303
§ 371 (c)(1),
(2) Date: Feb. 14, 2017

(87) PCT Pub. No.: WO2016/028314
PCT Pub. Date: Feb. 25, 2016

(65) Prior Publication Data
US 2017/0245310 A1    Aug. 24, 2017

(51) Int. Cl.
*H04W 76/10* (2018.01)
*H04W 60/00* (2009.01)
(Continued)

(52) U.S. Cl.
CPC ............. *H04W 76/10* (2018.02); *H04W 8/06* (2013.01); *H04W 8/20* (2013.01); *H04W 36/00* (2013.01);
(Continued)

(58) Field of Classification Search
CPC . H04W 72/04; H04W 72/14; H04W 72/0413; H04W 76/10; H04W 28/18; H04W 48/18
See application file for complete search history.

(56) References Cited

U.S. PATENT DOCUMENTS 9,147,294 B1 * 9/2015 Weinfield ............... G07C 5/008
2002/0150092 A1   10/2002 Bontempi et al.
(Continued)

FOREIGN PATENT DOCUMENTS

| CN | 102187708 A | 9/2011 |
| WO | 2013/113181 A1 | 8/2013 |

OTHER PUBLICATIONS

International Search Report and Written Opinion dated Jan. 20, 2015 corresponding to International Patent Application No. PCT/US2014/052303.
(Continued)

*Primary Examiner* — Jaime M Holliday
(74) *Attorney, Agent, or Firm* — Squire Patton Boggs (US) LLP

(57) ABSTRACT

Communication systems may benefit from connection setup improvements. For example, fifth generation communication systems may benefit from low latency service connection setup for 5G network terminal in new service areas. A method can include receiving an indication of preference for services from a 5G network terminal. The method can also include determining that the indication indicates a preference for low latency services. The method can further include determining whether the low latency services are offered in a tracking area of the 5G network terminal. The method can additionally include communicating with the 5G network terminal regarding the availability of the low latency services.

8 Claims, 9 Drawing Sheets

(51) Int. Cl.

| | | |
|---|---|---|
| *H04W 36/00* | (2009.01) | |
| *H04W 8/20* | (2009.01) | |
| *H04W 8/06* | (2009.01) | |
| *H04W 36/32* | (2009.01) | |
| *H04W 36/12* | (2009.01) | |
| *H04W 72/14* | (2009.01) | |
| *H04W 28/18* | (2009.01) | |
| *H04W 48/18* | (2009.01) | |
| *H04W 72/04* | (2009.01) | |

(52) U.S. Cl.
CPC ........... *H04W 36/32* (2013.01); *H04W 60/00* (2013.01); *H04W 28/18* (2013.01); *H04W 36/12* (2013.01); *H04W 48/18* (2013.01); *H04W 72/04* (2013.01); *H04W 72/0413* (2013.01); *H04W 72/14* (2013.01)

(56) References Cited

U.S. PATENT DOCUMENTS

| | | |
|---|---|---|
| 2003/0217166 A1 | 11/2003 | Dal Canto et al. |
| 2004/0253964 A1 | 12/2004 | Zhu |
| 2008/0174491 A1 | 7/2008 | Kim et al. |
| 2010/0120448 A1 | 5/2010 | Iwamura et al. |
| 2011/0122817 A1 | 5/2011 | Russell et al. |
| 2011/0158165 A1* | 6/2011 | Dwyer ................. H04W 60/00 370/328 |
| 2011/0159895 A1* | 6/2011 | Arzelier ................. H04W 4/12 455/466 |
| 2012/0039250 A1 | 2/2012 | Li et al. |
| 2012/0115417 A1* | 5/2012 | Moring ................. H04W 48/20 455/41.2 |
| 2013/0268604 A1 | 10/2013 | Gupta et al. |
| 2014/0036774 A1 | 2/2014 | Lehane et al. |
| 2014/0056246 A1 | 2/2014 | Chun et al. |
| 2015/0195827 A1* | 7/2015 | Feng ................. H04L 63/0428 380/270 |
| 2017/0013648 A1* | 1/2017 | Jung ................. H04W 8/005 |

OTHER PUBLICATIONS

L2population blueprint—OpenStack, http://wiki.openstack.org/wiki/L2population_blueprint, pp. 1-9.

3GPP TS 23.246 V12.2.0 (Jun. 2014), Technical Specification, 3rd Generation Partnership Project; Technical Specification Group Services and System Aspects; Multimedia Broadcast/Multicast Service (MBMS); Architecture and functional description (Release 12), Jun. 2014, pp. 1-67.

3GPP TS 23.401 V10.3.0 (Mar. 2011); 3rd Generation Partnership Project; Technical Specification Group Services and System Aspects; General Packet Radio Service (GPRS) enhancements for Evolved Universal Terrestrial Radio Access Network (E-UTRAN) access (Release 10); 2011.

Huawei et al S2-134199 ( revision of S2-13xxxx), Overview of normative changes for the small data services; 2013.

NEC S2-131735, Updates to Small Data connection release in clause 5.1.1.3.1 (solution 1); 2013.

European Search Report application No. 14899955.0 dated Mar. 22, 2018.

European Search Report corresponding the Appln. No. 14899955.0, dated Jul. 27, 2018.

3GPP TS 23.271 V12.1.0 (Jun. 2014), 3rd Generation Partnership Project; Technical Specification Group Services and System Aspects; Functional stage 2 description of Location Services (LCS) (Release 12); 2014.

European Office Action corresponding to EP Appln. No. 14 899 955.0, dated Oct. 11, 2019.

Chinese Office Action corresponding to CN Application No. 201480082844.3, dated Aug. 12, 2019.

* cited by examiner

Cell 1 is part of TAI-x, SA1 and it maps to Service domain 1 addressed by FQDN1
Cell 2 is part of TAI-x, SA2 and it maps to Service domain 2 addressed by FQDN2

LOW LATENCY SERVICE CONNECTION SETUP IN NEW SERVICE AREA

BACKGROUND

Field

Communication systems may benefit from connection setup improvements. For example, fifth generation communication systems may benefit from low latency service connection setup for 5G network terminal in new service areas.

Description of the Related Art

New mobile low-latency and ultra-reliable services may be supported in fifth generation (5G), especially for use cases involving vehicle to vehicle (V2V) or vehicle to infrastructure (V2I), collectively V2X.

FIG. 1 illustrates a reference 5G architecture. As shown in FIG. 1, the architecture can be divided into domains of mobile access, networking service, and application. Each domain can include control plane and user plane aspects. At the leftmost side, there can be internet protocol (IP) and Ethernet (ETH) user to network interfaces (UNIs) over a 5G network terminal (NT) serviced by an access point (AP). The access point can be connected by interface S1*c to a control mobility gateway (cMGW) and by interface S1*u to a user plane gateway (uGW). The cMGW can be connected to a home subscriber server (HSS) via an S6a* interface. The uGW and cMGW can be connected to one another over an Sx interface. Thus, the AP, uGW, cMGW, and HSS can be provided in the mobile access domain.

The HSS can be connected to an authentication, authorization, and accounting (AAA) server over an ASIa interface, which can be one example of an access to service interface (ASI). The cMGW can be connected to a control plane service edge (cSE) node over an ASIc interface. Furthermore, the uGW can be connected to a user plane service edge (uSE) node over an ASIu interface. The cSE can be connected by respective interfaces to the AAA server and the uSE. Thus, the uSE, cSE, and AAA server can be provided in the networking service domain.

The AAA server can interface with an application user database. Furthermore, the uSE can interface with an application server. The application server and the application user database can be provided in the application domain.

V2X is an example use case for local services, and traffic control organized in small geographical areas to cover important road intersections is an example of V2X. Each traffic control area, which is an example of a service area, can use a local virtual private (VP) local area network (LAN) service (in short VPL service), can have a local router, and an application server.

FIG. 2 illustrates a traffic control service use case. As shown in FIG. 2, there can be a plurality of traffic control zones, here illustrated as traffic control zone 1 and traffic control zone 2. The traffic control zones may overlap with a plurality of radio cells. Multiple 5G network terminal (5G NT) devices may be present in the zones. 5G network terminals are examples of user equipment that can be used, although other user equipment are permitted. In FIG. 2, 5G NT3 is shown in traffic control zone 2 and 5G NT2 is shown in traffic control zone 1. 5G NT1 is shown in initially in traffic control zone 1, but moving to the border of traffic control zone 1 and traffic control zone 2. In each zone there can be a respective VPL service instance: VPL service instance 1 is shown in traffic control zone 1 and VPL service instance 2 is shown in traffic control zone 2. Each zone may be provided a respective tenant router and traffic control server. The VPL service instances can belong to a mobile network operator, while the tenant routers and traffic controllers can belong to a traffic control application provider.

The term "local service" can refer to a service that is provided by a mobile network in a pre-defined geographic area of typically some hundred meters to some kilometers extension.

Fundamental challenges in supporting local, low latency and mission critical services, as may be needed for V2X applications, include early detection and fast autonomous setup of the service connection once a 5G NT approaches a respective service area. This may include the special case that the 5G NT moves from one service area, service area 1 to another service area, service area 2.

The service may need to be made available to the 5G NT before the service will be used, such as before the vehicle enters a critical street intersection area. On the other hand, it may not be acceptable to connect potential service users too early to the service, as this may require unnecessary network resources by generating dummy load.

A further challenge is that in idle state the location of a 5G NT may only be known with rather coarse granularity, such as with a tracking area list (TAL), which can make a decision for service connection based on this TAL rather imprecise.

SUMMARY

According to certain embodiments, a method can include receiving an indication of preference for services from a user equipment. The method can also include determining that the indication indicates a preference for low latency services. The method can further include determining whether the low latency services are offered in a tracking area of the user equipment. The method can additionally include communicating with the user equipment regarding the availability of the low latency services.

In certain embodiments, a method can include determining that a user equipment has a changed mobile specific area identifier or determining that a user equipment has a changed service area identifier. The method can further include reporting a mobility event based on the changed mobile specific area identifier or changed service area identifier. The mobility event can be configured to trigger conditional network initiated service connection setup.

A method, according to certain embodiments, receiving a report a changed mobile specific area identifier or changed service area identifier, for a user equipment. The method can also include determining whether a new service area, corresponding to the changed mobile specific area identifier or changed service area identifier, offers the service to the user equipment. The method can further include triggering network initiated service connection setup upon determining that the service is offered in the new service area.

A method, in certain embodiments, can include receiving a tracking area update accept message with a service availability indicator. The method can also include determining whether to initiate service connection setup based on the service availability indicator. The method can further include initiating establishment of service connection setup when it is so determined.

A computer program product can, in certain embodiments, encode instructions for performing a process, such as any of the preceding methods.

A non-transitory computer-readable medium can, according to certain embodiments, be encoded with instructions that, when executed in hardware, perform a process, such as any of the preceding methods.

According to certain embodiments, an apparatus can include at least one processor and at least one memory including computer program code. The at least one memory and the computer program code can be configured to, with the at least one processor, cause the apparatus at least to receive an indication of preference for services from a user equipment. The at least one memory and the computer program code can also be configured to, with the at least one processor, cause the apparatus at least to determine that the indication indicates a preference for low latency services. The at least one memory and the computer program code can further be configured to, with the at least one processor, cause the apparatus at least to determine whether the low latency services are offered in a tracking area of the user equipment. The at least one memory and the computer program code can additionally be configured to, with the at least one processor, cause the apparatus at least to communicate with the user equipment regarding the availability of the low latency services.

In certain embodiments, an apparatus can include at least one processor and at least one memory including computer program code. The at least one memory and the computer program code can be configured to, with the at least one processor, cause the apparatus at least to determine that a user equipment has a changed mobile specific area identifier or determining that a user equipment has a changed service area identifier. The at least one memory and the computer program code can also be configured to, with the at least one processor, cause the apparatus at least to report a mobility event based on the changed mobile specific area identifier or changed service area identifier. The mobility event can be configured to trigger conditional network initiated service connection setup.

An apparatus, according to certain embodiments, can include at least one processor and at least one memory including computer program code. The at least one memory and the computer program code can be configured to, with the at least one processor, cause the apparatus at least to receive a report a changed mobile specific area identifier or changed service area identifier, for a user equipment. The at least one memory and the computer program code can also be configured to, with the at least one processor, cause the apparatus at least to determine whether a new service area, corresponding to the changed mobile specific area identifier or changed service area identifier, offers the service to the user equipment. The at least one memory and the computer program code can further be configured to, with the at least one processor, cause the apparatus at least to trigger network initiated service connection setup upon determining that the service is offered in the new service area.

An apparatus, in certain embodiments, can include at least one processor and at least one memory including computer program code. The at least one memory and the computer program code can be configured to, with the at least one processor, cause the apparatus at least to receive a tracking area update accept message with a service availability indicator. The at least one memory and the computer program code can also be configured to, with the at least one processor, cause the apparatus at least to determine whether to initiate service connection setup based on the service availability indicator. The at least one memory and the computer program code can further be configured to, with the at least one processor, cause the apparatus at least to initiate establishment of service connection setup when it is so determined.

According to certain embodiments, an apparatus can include means for receiving an indication of preference for services from a user equipment. The apparatus can also include means for determining that the indication indicates a preference for low latency services. The apparatus can further include means for determining whether the low latency services are offered in a tracking area of the user equipment. The apparatus can additionally include means for communicating with the user equipment regarding the availability of the low latency services.

In certain embodiments, an apparatus can include means for determining that a user equipment has a changed mobile specific area identifier or determining that a user equipment has a changed service area identifier. The apparatus can also include means for reporting a mobility event based on the changed mobile specific area identifier or changed service area identifier. The mobility event can be configured to trigger conditional network initiated service connection setup.

An apparatus, according to certain embodiments, can include means for receiving a report a changed mobile specific area identifier or changed service area identifier, for a user equipment. The apparatus can also include means for determining whether a new service area, corresponding to the changed mobile specific area identifier or changed service area identifier, offers the service to the user equipment. The apparatus can further include means for triggering network initiated service connection setup upon determining that the service is offered in the new service area.

An apparatus, in certain embodiments, can include means for receiving a tracking area update accept message with a service availability indicator. The apparatus can also include means for determining whether to initiate service connection setup based on the service availability indicator. The apparatus can further include means for initiating establishment of service connection setup when it is so determined.

BRIEF DESCRIPTION OF THE DRAWINGS

For proper understanding of the invention, reference should be made to the accompanying drawings, wherein.

DETAILED DESCRIPTION

Figure 1:
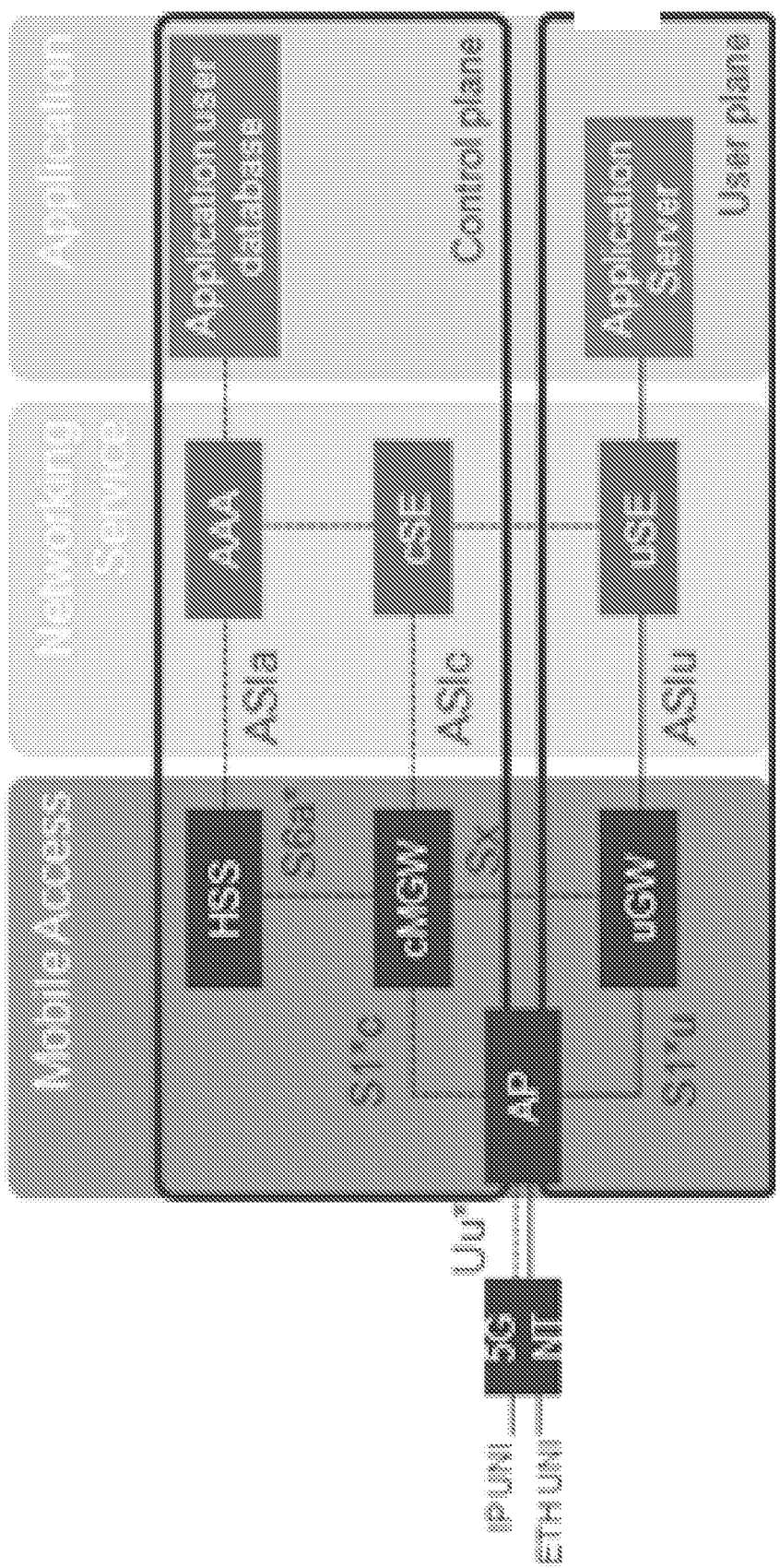
FIG. 1 illustrates a reference 5G architecture.
Figure 2:
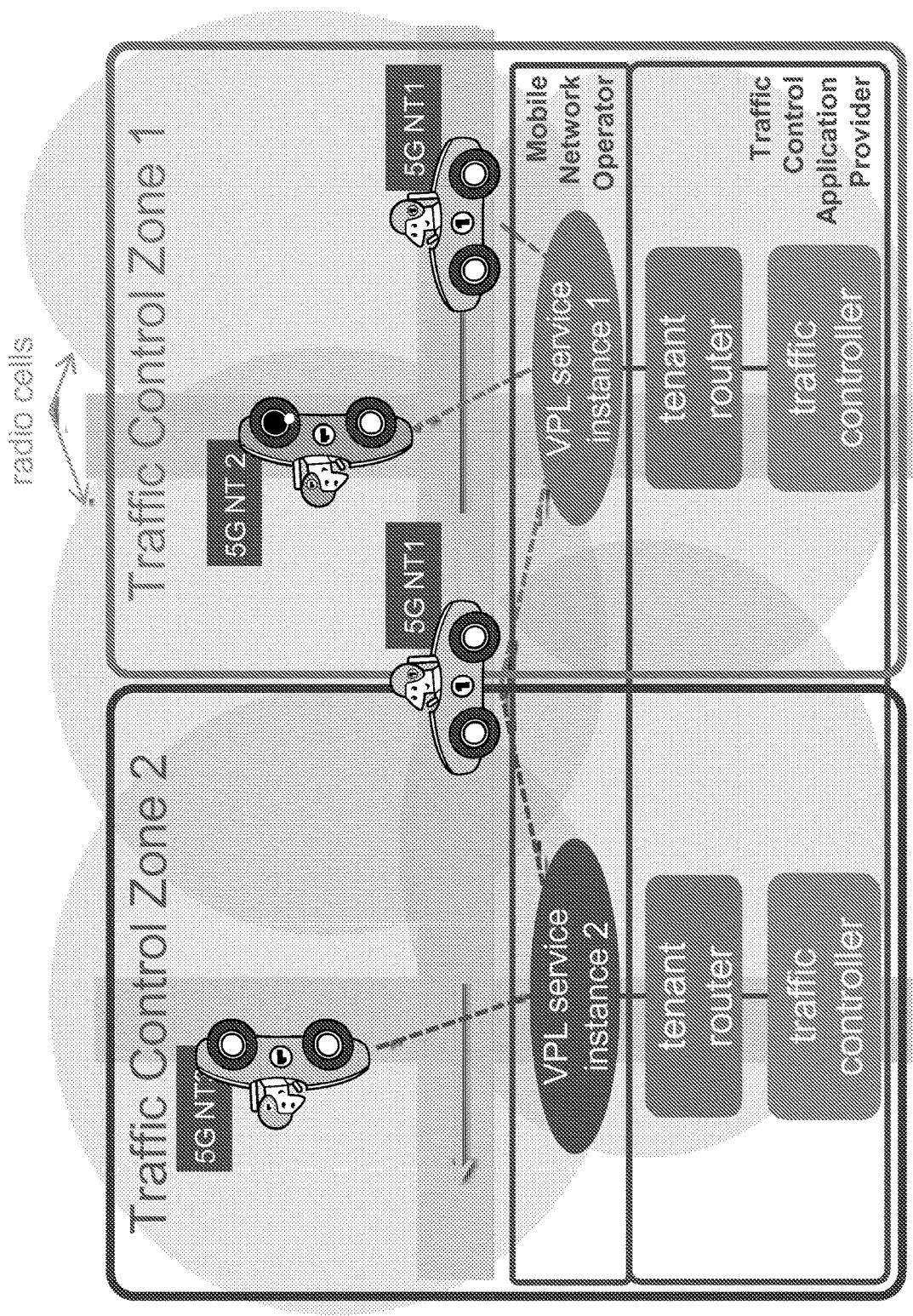
FIG. 2 illustrates a traffic control service use case.

Service detection can be based on service announcements. There is, however, no conventional approach to providing service announcement for application services, such as V2X services. 3GPP specifies service announcement procedure for multimedia broadcast multicast service (MBMS). 3GPP TS 23.246 states that the following, among others, may be useful for MBMS user service announcement mechanisms: SMS Cell Broadcast to advertise MBMS Multicast and Broadcast user services; MBMS Broadcast mode to advertise MBMS Multicast and Broadcast user Services; MBMS Multicast mode to advertise MBMS Multicast user Services; PUSH mechanism (WAP, SMS-PP, MMS); and URL (HTTP, FTP).

Such solutions do not take into account user mobility nor enable automatic triggering of service connection setup. MBMS is expected to be used more for services not requiring high mobility such as TV broadcasting and group communication for Public Safety use cases, group communication system enablers (GCSE) in rel-12.

The GCSE application server (AS) may be notified of a user's mobility. This notification may be accomplished by enabling a feature called user location information (ULI). In addition, the GCSE AS can register a "presence reporting area" that can include a list of TAI(s) or list of cell ID(s) and it can use this information to decide whether broadcast should be initiated or not for group communication. Such an arrangement can enable efficient use of resources by enabling MBMS setup for large number of users or unicast for a limited number of users in a certain service area. These approaches do not require any automatic action from the 5G NT.

Certain embodiments, therefore, can provide a fast service setup solution when the user moves into a new service area and, when the user moves across service areas, such as from one service area to another. "Service area" can refer to an area where a given service, such as V2X, is offered by the service provider to its subscribers.

Certain embodiments provide for various aspects including pre-registration of a MAC address of a 5G network terminal and pre-establishment of network resources based on a 5G NT preference indicator for obtaining specific services, such as low latency services.

Pre-establishment of network resources can include a network retaining a radio link after completion of tracking area update (TAU). By contrast, in a conventional approach the radio link is released after TAU is complete when 5G NT does not explicitly set the "active flag". In this case, 5G NT may not necessarily set the active flag because the 5G NT may not know if low latency service is offered in the given tracking area (TA). Thus the network can use the preference indication for low latency services and the network's own service offering to decide about connection setup. Pre-establishment of network resources can also include pre-establishment of tunnels by the network in preparation for the new service and to avoid delays due to setup.

The following processes can be used for purposes such as to enable fast service setup when the user moves into a new service area, either in idle mode or in connected mode.

According to certain embodiments, there can be setup of U-plane forwarding state. For example, in case of an Ethernet service, there can be forwarding tables in the Ethernet switching functions, which are updated with the new joining MAC address(es) of the host(s) behind the 5G NT. This can be done based on the pre-registration of the MAC address(es) at service subscription time, and/or auto-registration when 5G NT and host network configuration changes.

Certain embodiments can also provide for a user moving into new service area in idle mode. In certain embodiments, for example, the tracking areas around a service area can be marked with a service specific tag within the context stored in the mobile network. This information may be accessible to a mobility management function. When the user moves into a new service area in idle mode and performs tracking area update, such as a TAU for a certain traffic area identifier (TAI), based on this specific service tag associated to the TAI and the service subscription information of the 5G NT, the mobility management function can initiate fine granular location tracking for the 5G NT once the tracking area update of the 5G NT includes the corresponding tracking area.

Once fine granular location tracking is activated for a 5G NT and the 5G NT enters the pre-defined service area, the following actions can be initiated. In a tracking area update accept message, the network can indicate the availability of a low latency service, such as V2X, in the area.

Conventionally in long term evolution (LTE), upon completion of TAU procedure without an active flag, the network initiates release of the NAS signaling connection which triggers release of RRC connection towards the 5G NT. In order to expedite the setup of low latency services and avoid re-establishing the NAS signaling connection again, or for other reasons, the network can retain the network access stratum (NAS) signaling connection for a certain fixed duration if the 5G NT has indicated a preference for low latency services in the request. This retained connection can permit the 5G NT to receive the TAU accept message and make a decision on whether new service is required or not. In addition, the network can also decide whether to initiate setup of the new service connection if the 5G NT indicates preference for low latency services.

Upon receiving TAU accept with the service availability indicator, the 5G NT can decide whether it should initiate service connection setup.

Establishment of a new service connection may also trigger assignment of an IP address. In addition, establishment of a new service flow can trigger instantiation of an ARP-Proxy function for the 5G NT originating traffic and setup/update of the IP/MAC address resolution tables in the service provider network.

Figure 3:
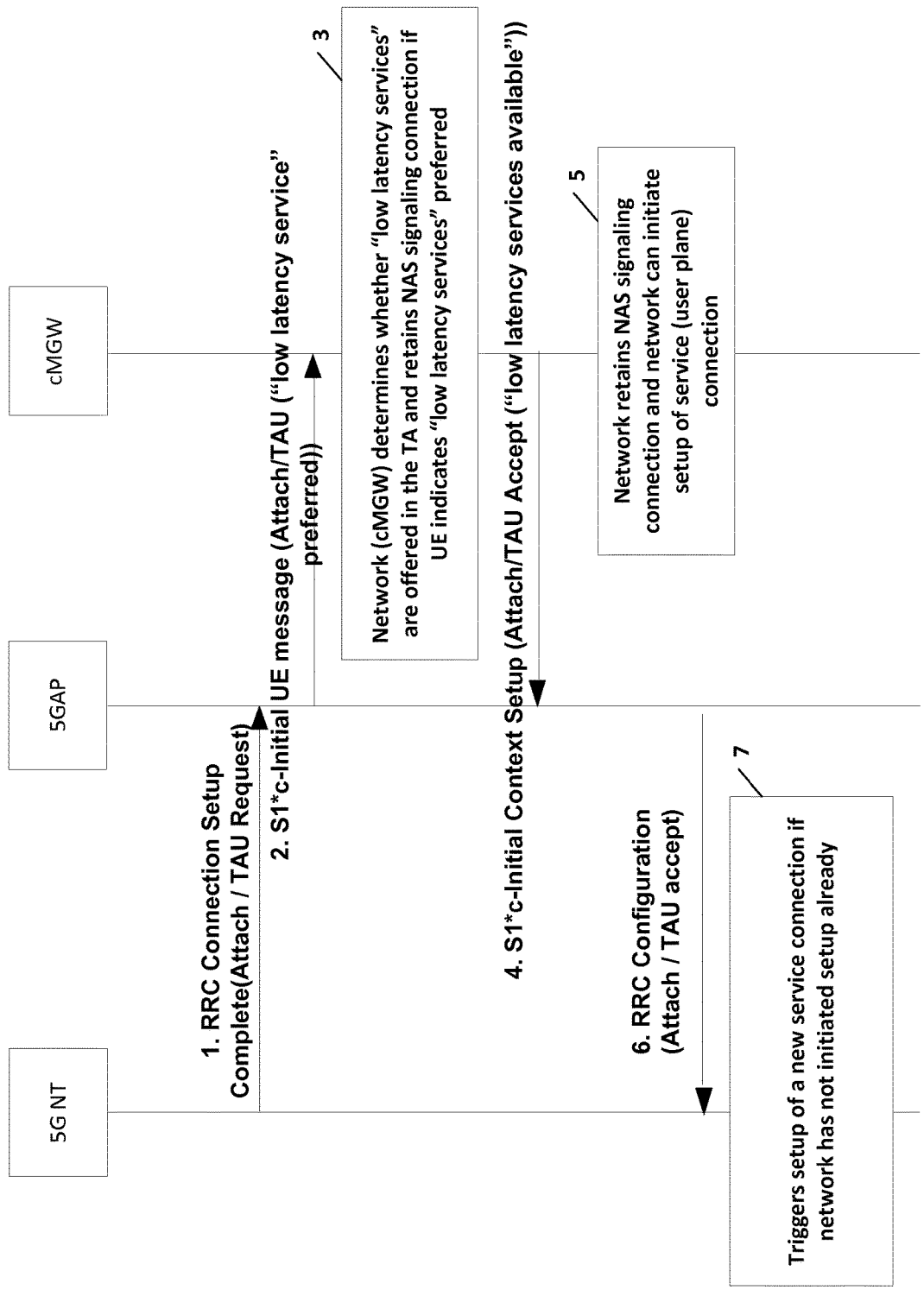
FIG. 3 illustrates a signal flow of a method according to certain embodiments.

FIG. 3 illustrates a signal flow of a method according to certain embodiments. As shown in FIG. 3, at 1 a 5G NT can send a radio resource control (RRC) connection setup complete to a fifth generation access point (5GAP), which includes the NAS message attach or tracking area update message. Then, at 2, the 5GAP can send an S1*c-initial 5G NT message to the cMGW, forwarding the attach or tracking area update message with an indication that a low latency service is preferred (based on 5G NT context information).

At 3, the mobility gateway (cMGW) or another network element can determine whether the indicated services, such as low latency services, are offered in the tracking area (TA) and can retain NAS signaling connection if the 5G NT has indicated that low latency services are preferred.

At 4, the MGW can respond with an S1c-initial context setup accept message including a NAS message (attach or TAU accept message) to be sent to the 5G NT. The message can indicate that low latency services are available. At 5, the network can retain NAS signaling connection and can initiate setup of the service connection (user plane).

The 5GAP can, at 6, send an RRC configuration message including the attach or tracking area update accept and the availability of the low latency services. This message can, at 7, trigger the 5G NT to setup a new service connection, if the low latency service is offered and if the network has not initiated setup already.

Certain embodiments address the situation in which a user moves from one service area into another service area. The service area controllers may be registered for the reporting of mobility events. If the mobile network is not aware of the service topology, an event report can be generated when any mobile specific area identifier, such as tracking area or cell identifiers, changes. When the mobile network is aware of service topology, the event report may be generated only when the service area identifier changes. Mobility event reporting may not be needed when service area information is permanently broadcasted in the mobile network. It may be needed, however, when broadcasting is triggered by the presence of a service user in a certain cell.

As a further optional feature, mobility could be selectively reported to the service area domain during the handover preparation phase in order to help expedite the preparation in the service area controller.

Upon receiving a notification from mobile access networks about a 5G NT entering the new service area, if the service area is currently offering the service, network can dynamically initiate service connection setup. The following are some possible triggering options. As a first option, a service area controller can obtain a 5G NT addressable identifier, such as IP address, MSISDN or NAI, based on a received 5G NT ID. The service area controller can send a device triggering message via mobile control plane to the corresponding application in the 5G NT to take necessary actions.

As a second option, the service area controller can use a broadcasting mechanism to announce the service to the 5G NT(s) in the area, for example a location based broadcasting either using cell broadcasting or MBMS broadcasting. The broadcast received within the user's device may be able to trigger an application running in the 5G NT to take necessary actions.

As a third option, the service area controller can trigger establishment of user plane service connection in the mobile network. Upon completion of the service connection setup, the mobile network can notify the 5G NT that the service connection was set up for acknowledgement from the 5G NT. If the 5G NT is interested in the service, then the 5G NT can acknowledge the establishment and the 5G NT can start to access the service. If there is no response from the 5G NT for a certain fixed duration, then the network can trigger deactivation of the established connection.

Figure 4:
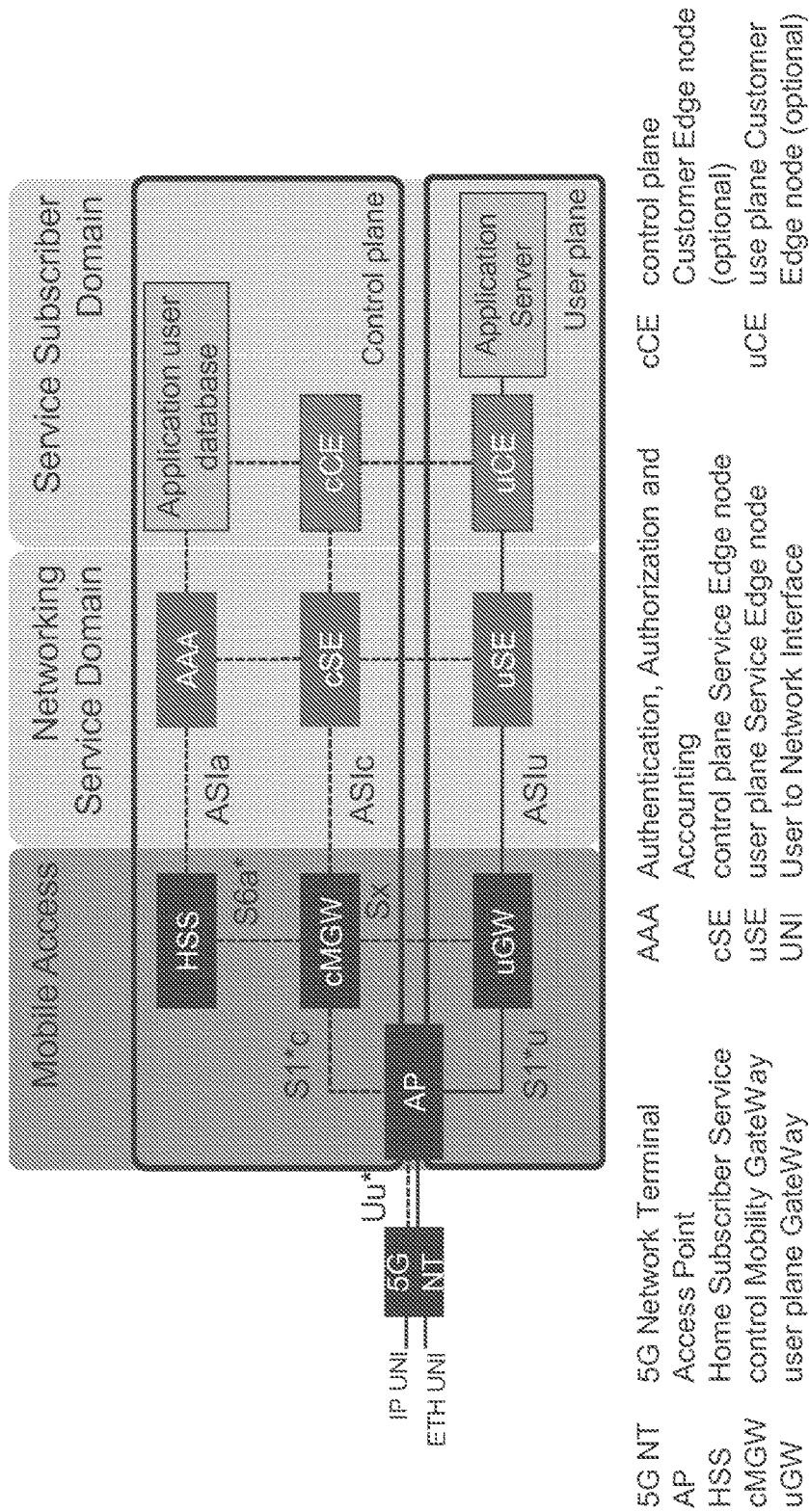
FIG. 4 illustrates a 5G logical reference architecture according to certain embodiments.

FIG. 4 illustrates a 5G logical reference architecture according to certain embodiments. As shown, FIG. 4 illustrates an architecture that it is similar to that shown in FIG. 1. However, in FIG. 4 there is additionally provided several optional features, such as a control plane customer edge (cCE) node in the control plane in a service subscriber domain. Additionally, a user plane customer edge (uCE) node is provided in the user plane in the service subscriber domain, between the uSE and the application server. The cCE can be connected via respective interfaces to the application user database and the uCE.

The availability of well defined service interfaces, mentioned above, can help to segregate layers and permit a flexible, multi-domain architecture. For example, a user plane component of the ASI (ASIu) can be used to access the service instances through physical or logical interfaces referred to as Service Access Points (SAPs). The concatenation of tunnels in the mobile access network and on the ASIu interface between the user (5G NT) and an instance of the SAP can be referred to as service connection. Control plane component of ASI (ASIc) can be used by the SE, for example to subscribe to reporting of mobility events, such as network attach, tracking area updates and handovers, or to subscribe to reporting of network performance measurements, such as latencies, congestion level. The mobility events or performance measurements can be related to a specific service user or connection. Gateways (GWs) can likewise use the ASIc procedures, for example during service connection setup.

In the following example it is assumed that both the Ethernet network in the service provider domain, as well as the IP network in the service subscriber domain, are based on SDN principles. For this purpose both domains have deployed SDN controllers cEth and cIP, respectively.

Once a car enters a radio cell that is part of a traffic control zone, this can be detected by the mobility management function of the 5G radio network. Based on the service subscription information and service configuration policies, the network can connect the 5GNT of the car to a local service access point (SAP) of the VPL service instance. Also the network can provide the identity of the new service user and SAP to which it has been connected to the SDN controller cEth over interface ASIc. The SDN controller cEth can retrieve the MAC addresses of the service user from the AAA server and install the forwarding rules in the Ethernet user plane of the uETH switch(es). This approach can optimize network load and latency by avoiding the broadcasting of MAC frames with unknown destination addresses in the Ethernet user plane.

In parallel the SDN controller cIP in the application domain, which controls the IP user plane, can be informed which MAC addresses will join the VPL service. Based on this information, the cIP can immediately assign IP addresses to the hosts in the new car without using Dynamic Host Configuration Protocol (DHCP) or Neighbor Discovery Protocol (NDP) procedures. For this purpose or for other purposes, the cIP can send a DHCPACK like IP packet via uETH and the VPL service to the host. This transmission can be done by encapsulating the packet into a unicast Ethernet frame. A modified DHCP client in the host can receive the packet and accordingly configure the IP stack in the host.

Address resolution in IP/Ethernet can be based on broadcasting Address Resolution Protocol (ARP) requests into the Ethernet sub-network. In certain embodiments, by contrast, ARP filters can be installed as a VPL feature in all SAPs. These ARP filters can intercept arriving ARP broadcasts from hosts and send appropriate ARP replies immediately back to the hosts. This can be done based on an address resolution table maintained by the cEth, which can be populated based on updates received from cIP.

Figure 5:
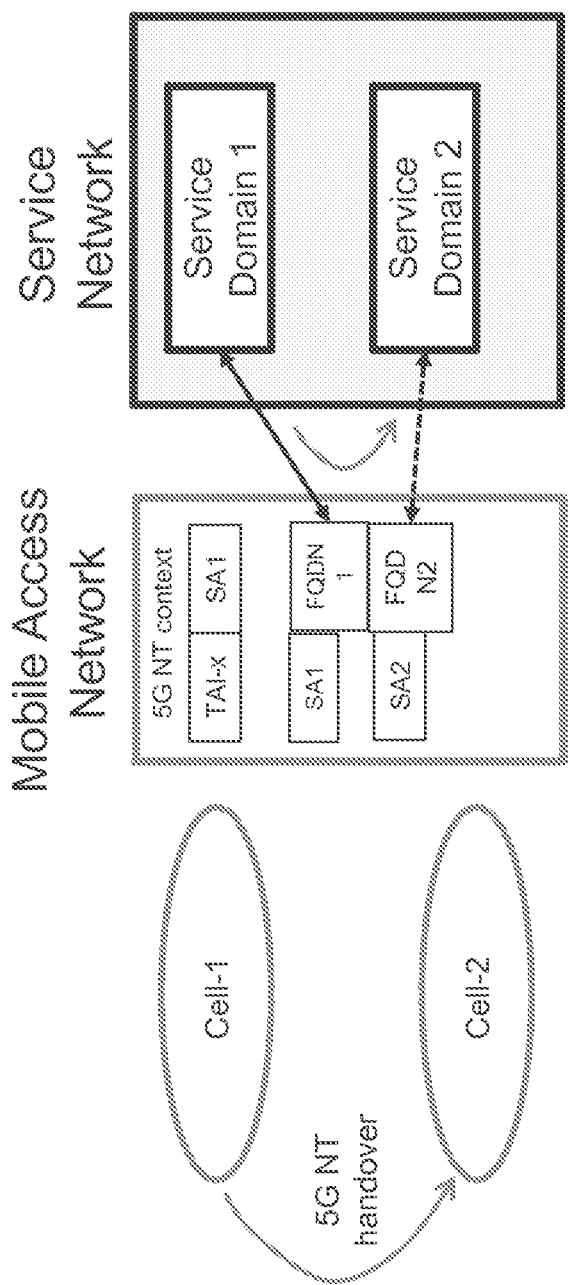
FIG. 5 illustrates a handover with respect to a service network, according to certain embodiments.

FIG. 5 illustrates a handover with respect to a service network, according to certain embodiments. As shown in FIG. 5, a 5G NT1 handover can occur between cell 1 and cell 2. Cell 1 can be part of TAI-x, SA1 and it can map to a service domain addressed by FQDN1. Cell 2 can be part of TAI-x, SA2 and it can map to a service domain addressed by FQDN2. Thus, as 5G NT1 is handed over from cell 1 to cell 2 it can also be transferred from service domain 1 to service domain 2.

The illustrated principles can be helpful in understanding users moving from one service area to another service area. When a mobile access network determines that the service area controller is subscribed for mobility events for list of users for a certain service, for example V2X, and a mobile network detects user's mobility in to a new service area, the mobile network can report a user's mobility to the new service area along with the 5G NT identifier. This may involve the mobile access network having service area controller information within its context based on service area. The service area controller information can include IP address or FQDN. The identification of the service area can be referred to as a "Service Area ID". Within mobile access network, a service area ID can map to a list of tracking areas, such as a list of tracking area(s) or a list of cell identifiers(s).

The user context in the mobile access network can include 5G NT ID, tracking area, and service area ID. The context in the mobile access network for service area can include service area ID and service area domain FQDN or IP address.

Figure 6:
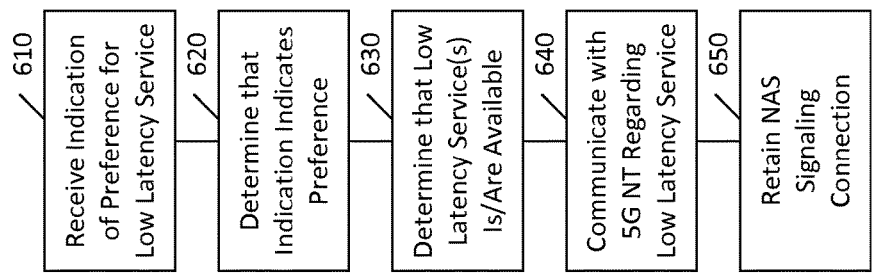
FIG. 6 illustrates a method according to certain embodiments.

FIG. 6 illustrates a method according to certain embodiments. As shown in FIG. 6, a method can include, at 610, receiving an indication of preference for services from a 5G network terminal. The indication of the preference can be provided in an initial 5G network terminal message.

The method can also include, at 620, determining that the indication indicates a preference for low latency services. The method can further include, at 630, determining whether the low latency services are offered in a tracking area of the 5G network terminal. The method can additionally include, at 640, communicating with the 5G network terminal regarding the availability of the low latency services.

The communication with the 5G network terminal can include providing an indication that low latency services are available. The indication that low latency services are available can be provided with a tracking area update accept message. More specifically, it can also include an indication that V2X services are available in the tracking area update accept message.

The method can also include, at 650, retaining network access stratum signaling connection when it is determined that the 5G NT indicates the preference for low latency services and that the low latency services are offered.

Figure 7:
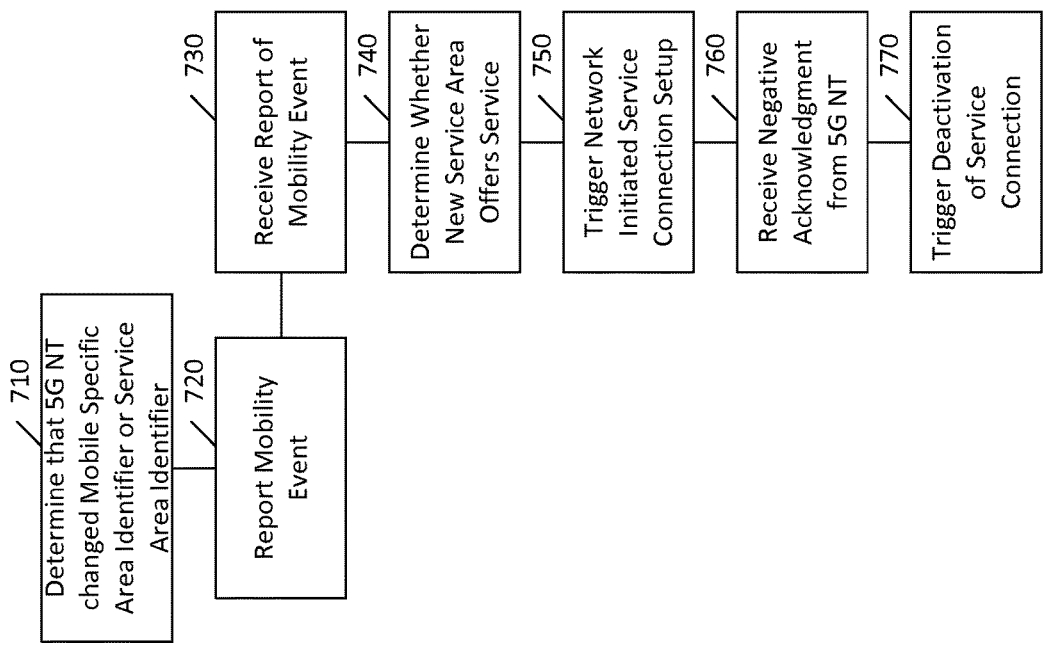
FIG. 7 illustrates another method according to certain embodiments.

FIG. 7 illustrates another method according to certain embodiments. As shown in FIG. 7, a method can include, at 710, determining that a 5G network terminal has a changed mobile specific area identifier or determining that a 5G network terminal has a changed service area identifier. The method can also include, at 720, reporting a mobility event based on the changed mobile specific area identifier or changed service area identifier. The mobility event can be configured to trigger conditional dynamic service connection setup by the network.

The method can further include, at 730, receiving a report a changed mobile specific area identifier or changed service area identifier, for a 5G network terminal. The method can also include, at 740, determining whether a new service area, corresponding to the changed mobile specific area identifier or changed service area identifier, offers a service previously offered to the 5G network terminal. The method can further include, at 750, triggering network initiated service connection setup upon determining that the service is offered in the new service area.

The triggering can include sending a device triggering message via a mobile control plane to a corresponding application in the 5G network terminal. Alternatively, or in addition, the triggering can include sending a broadcast message to announce the service to the 5G network terminal in the new service area, wherein the broadcast message is configured to trigger a corresponding application in the 5G network terminal. Alternatively, or in addition, the triggering can include setting up user plane resources for a service connection and notifying the 5G network terminal that the service connection is set up.

The method can also include, at 760, receiving a negative acknowledgment from the 5G network terminal regarding the service connection. The method can further include, at 770, triggering deactivation of the service connection based on the negative acknowledgment.

Figure 8:
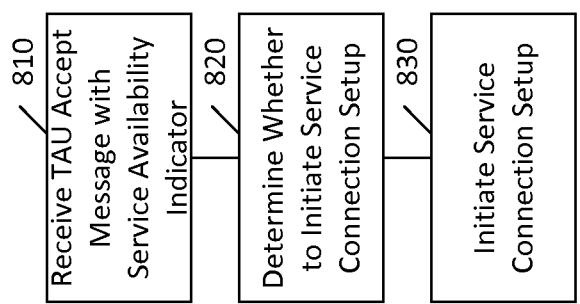
FIG. 8 illustrates a further method according to certain embodiments.

FIG. 8 illustrates a further method according to certain embodiments. As shown in FIG. 8, a method can include, at 810, receiving a tracking area update accept message with a service availability indicator. The method can also include, at 820, determining whether to initiate service connection setup based on the service availability indicator. The method can further include, at 830, initiating establishment of service connection when it is so determined.

Figure 9:
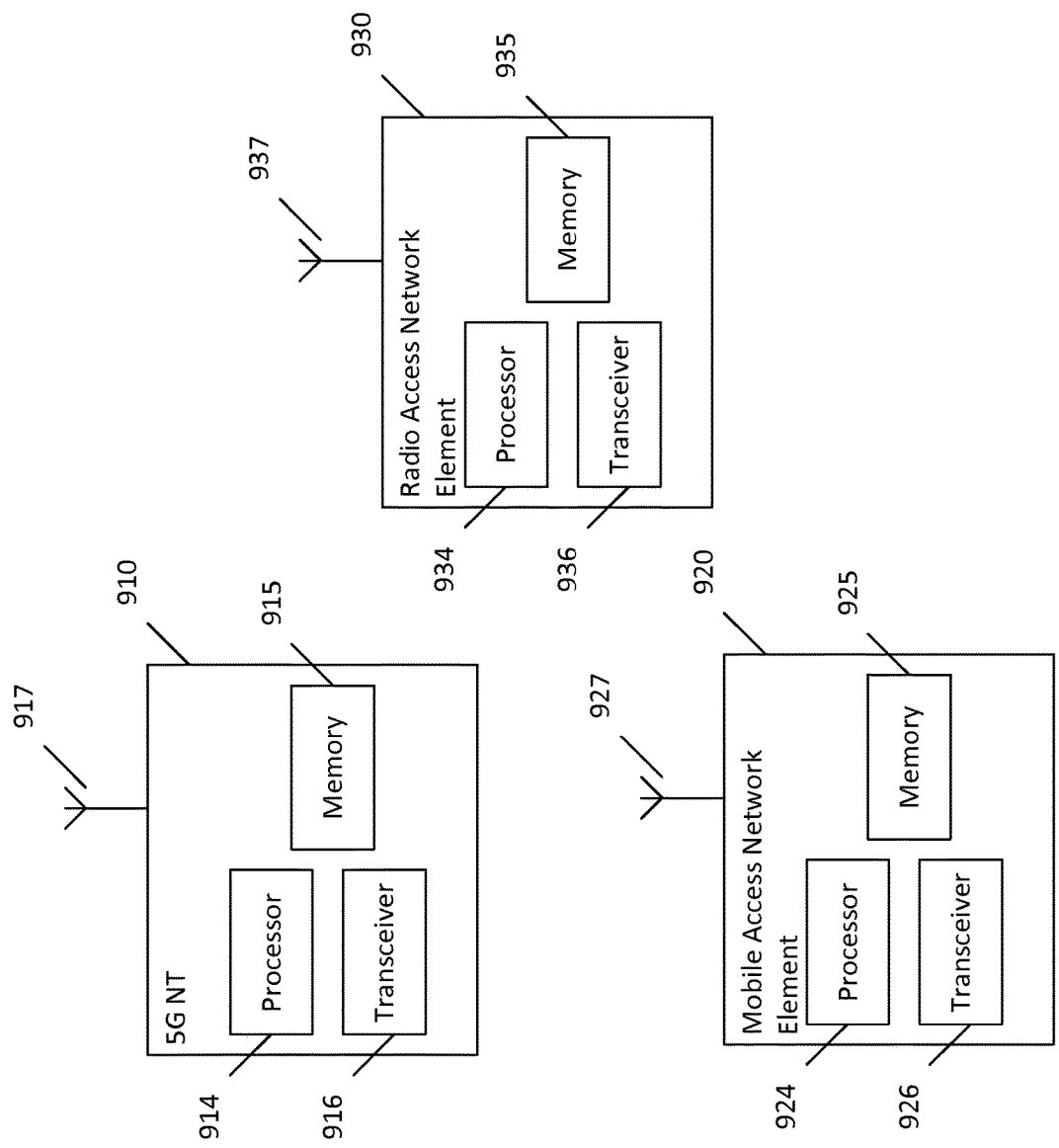
FIG. 9 illustrates a system according to certain embodiments.

FIG. 9 illustrates a system according to certain embodiments of the invention. In one embodiment, a system may include multiple devices, such as, for example, at least one 5G NT 910, at least one mobile access network element 920, which may be a control mobile gateway (cMGW) or any of the other mobile access network elements shown or discussed herein (see, for example, FIG. 5), and at least one radio access network element 930, which may be an access point, such as a $5^{th}$ generation access point. Other network elements, similarly configured, such as those of a subscriber service domain, can also be included.

Each of these devices may include at least one processor, respectively indicated as 914, 924, and 934. At least one memory can be provided in each device, and indicated as 915, 925, and 935, respectively. The memory may include computer program instructions or computer code contained therein. The processors 914, 924, and 934 and memories 915, 925, and 935, or a subset thereof, can be configured to provide means corresponding to the various blocks of FIGS. 6-8.

As shown in FIG. 9, transceivers 916, 926, and 936 can be provided, and each device may also include an antenna, respectively illustrated as 917, 927, and 937. Other configurations of these devices, for example, may be provided. For example, radio access network element 930 may be configured for wired communication, in addition to wireless communication, and in such a case antenna 937 can illustrate any form of communication hardware, without requiring a conventional antenna.

Transceivers 916, 926, and 936 can each, independently, be a transmitter, a receiver, or both a transmitter and a receiver, or a unit or device that is configured both for transmission and reception.

Processors 914, 924, and 934 can be embodied by any computational or data processing device, such as a central processing unit (CPU), application specific integrated circuit (ASIC), or comparable device. The processors can be implemented as a single controller, or a plurality of controllers or processors.

Memories 915, 925, and 935 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as 5G NT 910, mobile access network element 920, and radio access network element 930, to perform any of the processes described herein (see, for example, FIG. 6-8). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 9 illustrates a system including a 5G NT, mobile access network element, and radio access network element, embodiments of the invention may be applicable to other configurations, and configurations involving additional elements. For example, not shown, additional 5G NTs may be present, and additional core network elements may be present.

Certain embodiments may provide various benefits and/or advantages. For example, the end to end solution of certain embodiments described above may assist faster service setup in a new service area and enable faster service setup when 5G NT is moving from one service area to another. Furthermore, in certain embodiments pre-registration of a MAC address can also help with expediting generation of temporary keys for security purpose.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

PARTIAL GLOSSARY

3 GPP 3rd Partnership Project
ARP Address Resolution Protocol
FQDN Fully Qualified Domain Name
MSISDN Mobile Station Integrated Services Digital Network Number
NAI Network Access Identifier
SA Service Area
SDN Software Defined Networking
TAI Tracking Area Identifier
5G NT 5G network terminal

We claim:

1. A method, comprising:
receiving an indication of preference for services from a user equipment;
determining that the indication indicates a preference for low latency vehicle-to-everything (V2X) communication services;
determining whether the low latency V2X communication services are offered in a tracking area of the user equipment;
communicating with the user equipment regarding the availability of the offered low latency V2X communication services preferred by the user equipment; and
retaining a network access stratum signaling connection for a certain fixed duration when it is determined that the indication indicates the preference for low latency V2X communication services and that the low latency V2X communication services are offered.

2. The method of claim 1, wherein the communication comprises providing an indication that low latency V2X communication services are available.

3. The method of claim 2, wherein the indication that low latency V2X communication services are available is provided with a tracking area update accept message.

4. The method of claim 1, wherein the indication of the preference is provided in an initial user equipment message.

5. An apparatus, comprising:
at least one processor; and
at least one memory including computer program code,
wherein the at least one memory and the computer program code are configured to, with the at least one processor, cause the apparatus at least to
receive an indication of preference for services from a user equipment;
determine that the indication indicates a preference for low latency V2X communication services;
determine whether the low latency V2X communication services are offered in a tracking area of the user equipment;
communicate with the user equipment regarding the availability of the offered low latency V2X communication services preferred by the user equipment; and
retain a network access stratum signaling connection for a certain fixed duration when it is determined that the indication indicates the preference for low latency V2X communication services and that the low latency V2X communication services are offered.

6. The apparatus of claim 5, wherein the communication comprises providing an indication that low latency V2X communication services are available.

7. The apparatus of claim 6, wherein the indication that low latency V2X communication services are available is provided with a tracking area update accept message.

8. The apparatus of claim 5, wherein the indication of the preference is provided in an initial user equipment message.

* * * * *